(12) United States Patent
Kaplinsky

(10) Patent No.: US 7,623,152 B1
(45) Date of Patent: Nov. 24, 2009

(54) HIGH RESOLUTION NETWORK CAMERA WITH AUTOMATIC BANDWIDTH CONTROL

(75) Inventor: Michael Kaplinsky, Sierra Madre, CA (US)

(73) Assignee: Arecont Vision, LLC, Altadena, CA (US)

( * ) Notice: Subject to any disclaimer, the term of this patent is extended or adjusted under 35 U.S.C. 154(b) by 611 days.

(21) Appl. No.: 10/890,914

(22) Filed: Jul. 14, 2004

Related U.S. Application Data

(60) Provisional application No. 60/486,930, filed on Jul. 14, 2003.

(51) Int. Cl.
*H04N 5/228* (2006.01)

(52) U.S. Cl. ............... 348/208.16; 348/155; 348/211.3

(58) Field of Classification Search ............. 348/211.3, 348/208.4, 208.16, 208.13, 211.99, 208.14, 348/211.14, 305, 208.1, 208.3, 699, 382, 348/107, 402.1, 208.12, 208.6, 208.5, 208.15, 348/208.17, 208.99; 375/240.16, 240.17, 375/240.02

See application file for complete search history.

(56) References Cited

U.S. PATENT DOCUMENTS

| | | | | |
|---|---|---|---|---|
| 4,789,894 A | * | 12/1988 | Cooper | ....................... 348/155 |
| 5,229,850 A | * | 7/1993 | Toyoshima | ................. 348/153 |
| 5,296,852 A | * | 3/1994 | Rathi | ......................... 340/933 |
| 5,343,243 A | * | 8/1994 | Maeda | .................... 348/222.1 |
| 5,602,585 A | | 2/1997 | Dickinson et al. | |
| 6,011,901 A | * | 1/2000 | Kirsten | ....................... 386/123 |
| 6,181,878 B1 | * | 1/2001 | Honda | ........................ 396/310 |
| 6,301,440 B1 | * | 10/2001 | Bolle et al. | ................. 396/128 |
| 6,970,605 B1 | * | 11/2005 | Kondo et al. | ................ 382/254 |
| 7,075,567 B2 | * | 7/2006 | Hunter et al. | ......... 348/208.13 |
| 2002/0054211 A1 | * | 5/2002 | Edelson et al. | ............. 348/169 |
| 2004/0008773 A1 | * | 1/2004 | Itokawa | ................. 375/240.08 |
| 2004/0196433 A1 | * | 10/2004 | Durnell | ...................... 351/209 |
| 2005/0041156 A1 | * | 2/2005 | Kondo et al. | ................ 348/700 |

* cited by examiner

*Primary Examiner*—Sinh Tran
*Assistant Examiner*—Paul Berardesca
(74) *Attorney, Agent, or Firm*—Christie, Parker & Hale, LLP

(57) ABSTRACT

The subject of this invention is the network camera comprising an image sensor, image processor, and network interface, where image processor is capable of detecting the motion in the field of view of the camera, extracting/windowing the portion (sub-window) of the image that corresponds to that motion and submitting thus identified sub-window to the network interface hardware for transmission and where said image processor is also capable of submitting to the network interface the full field of view reduced-resolution (decimated) image either as the only image to be transmitted or as the image to be transmitted in a time-interleaved fashion with the said image window containing the motion.

30 Claims, 6 Drawing Sheets

Image transmission and display modes for network camera with automatic bandwidth control

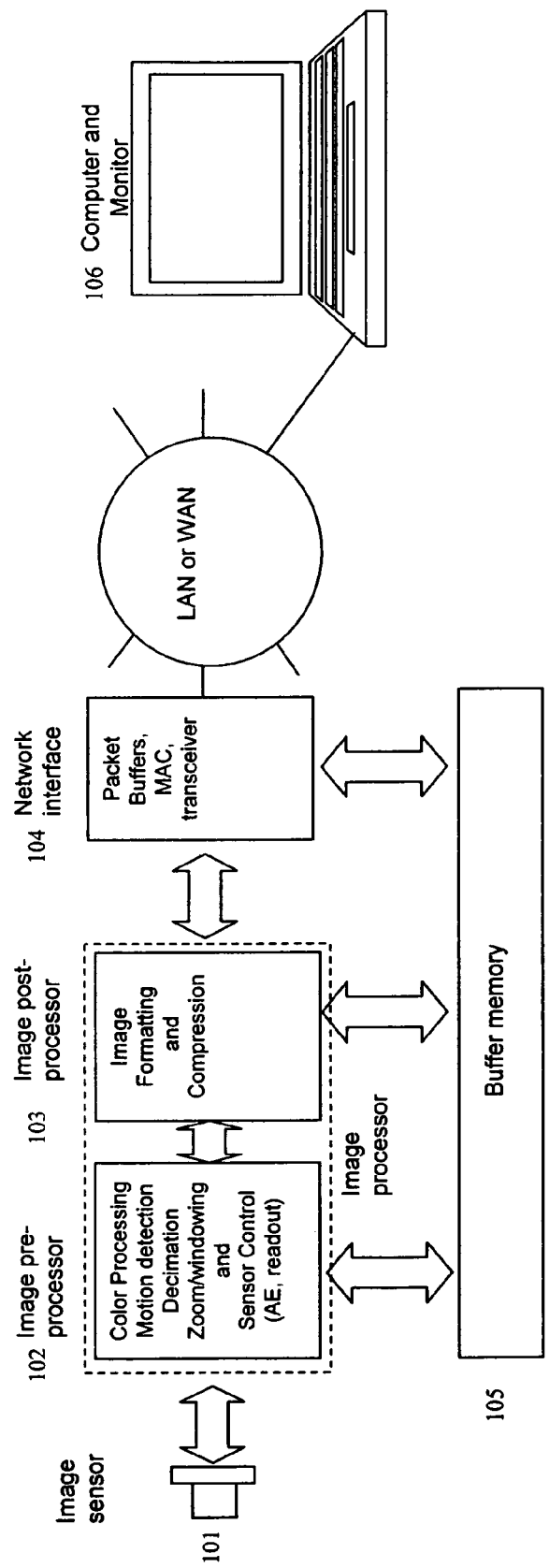
Figure 1. Network camera system with automatic bandwidth control

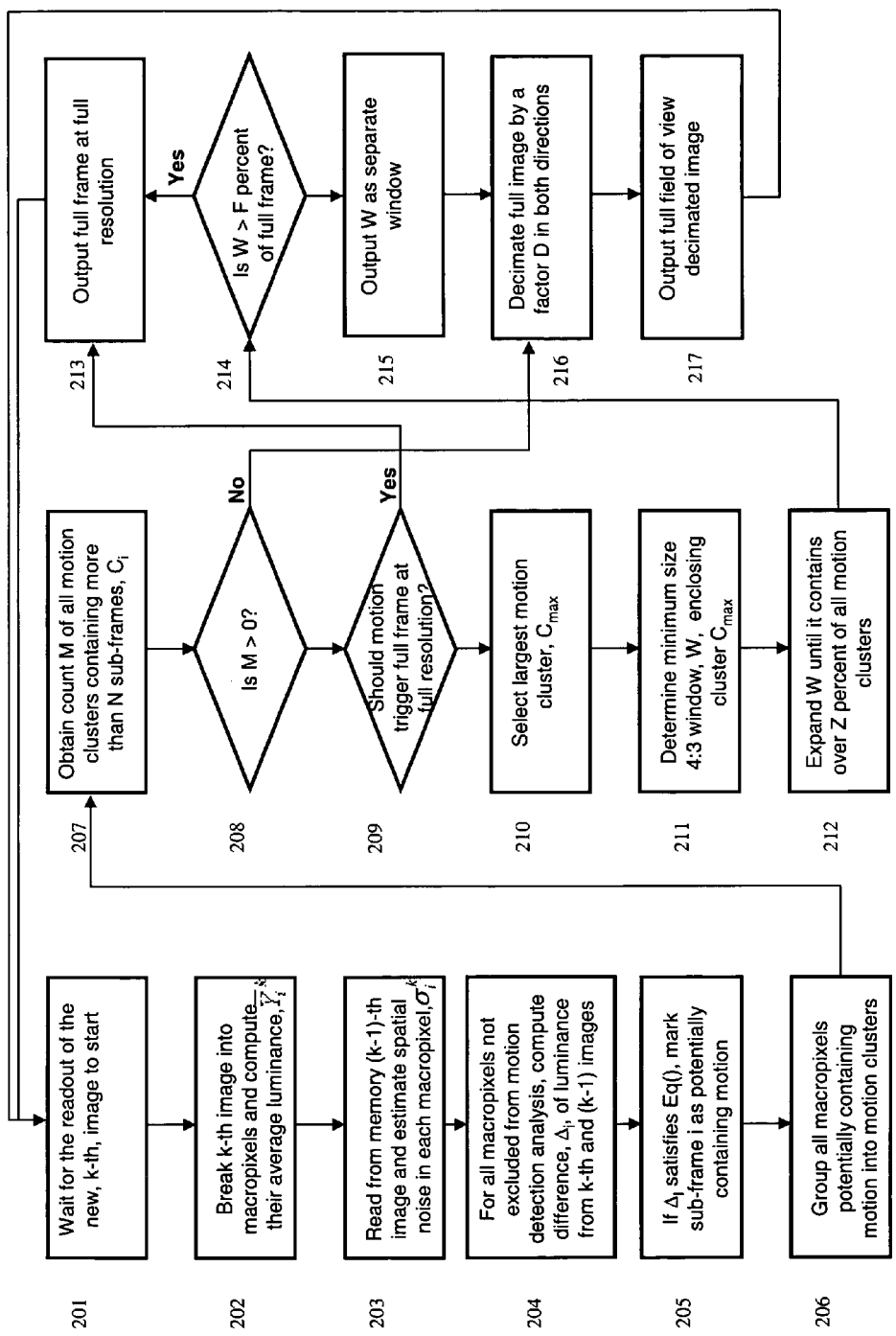
Figure 2. Steps for automatic resolution and zoom selection

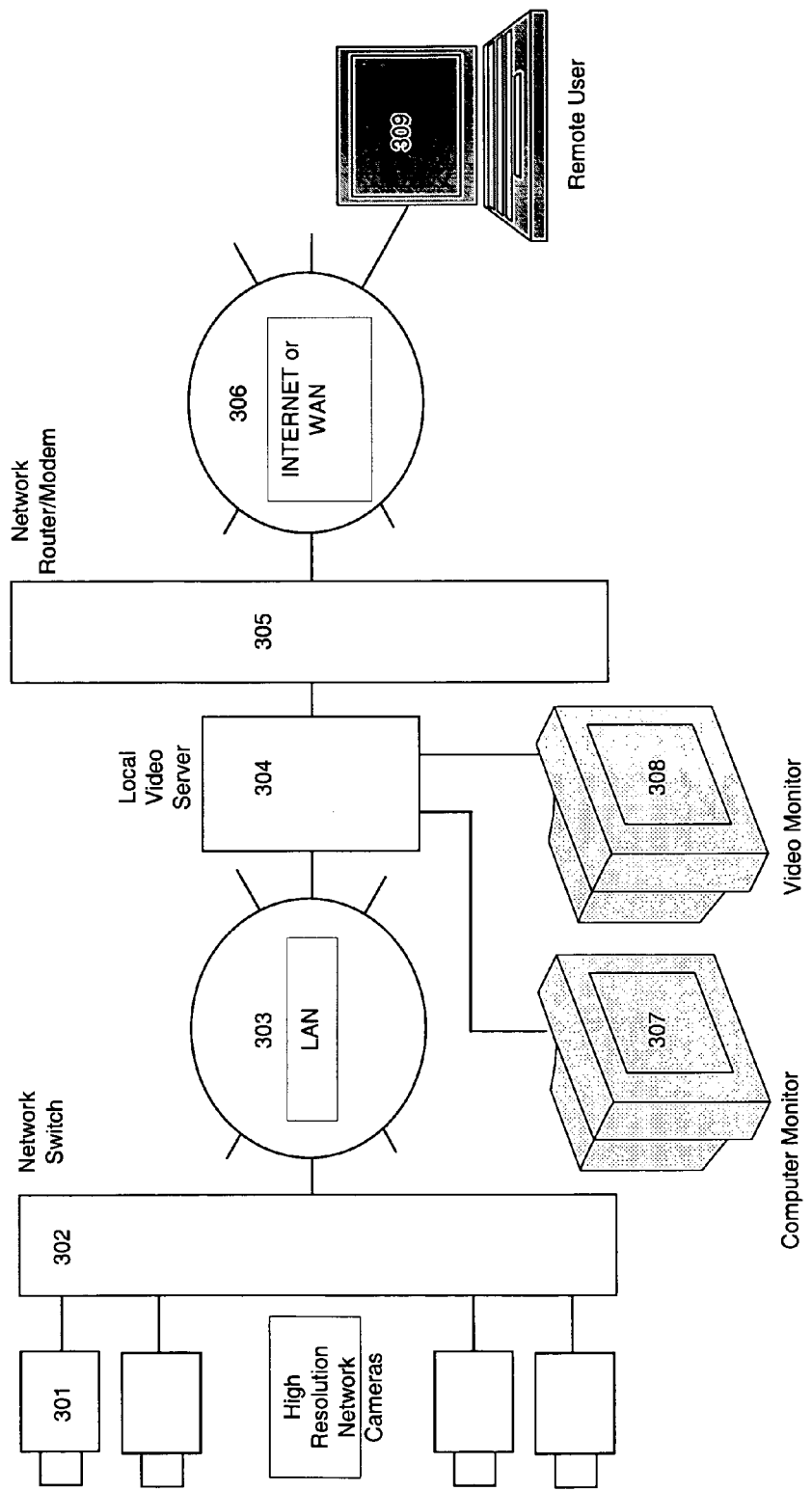
Figure 3. Multi-camera surveillance system

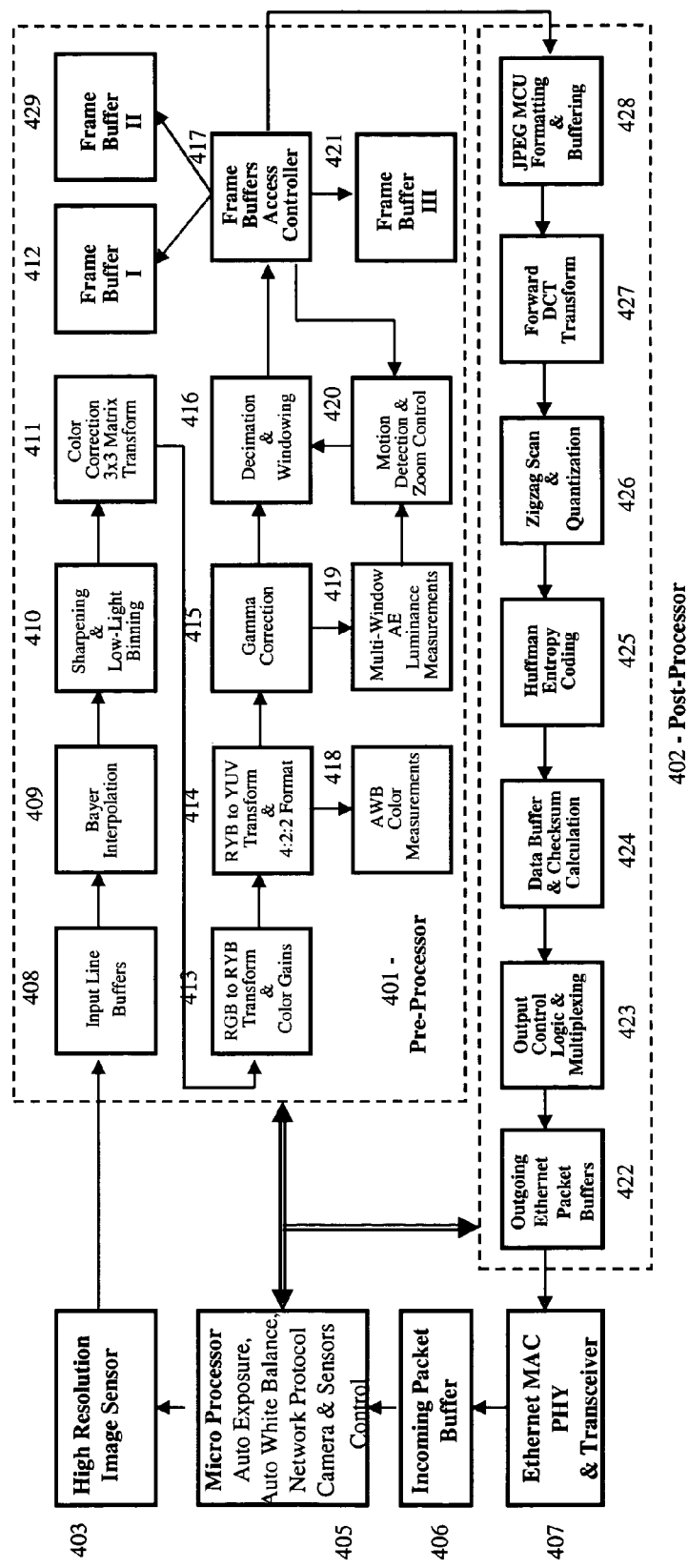
Figure 4. Block Diagram of Network Camera with Automatic Bandwidth Control

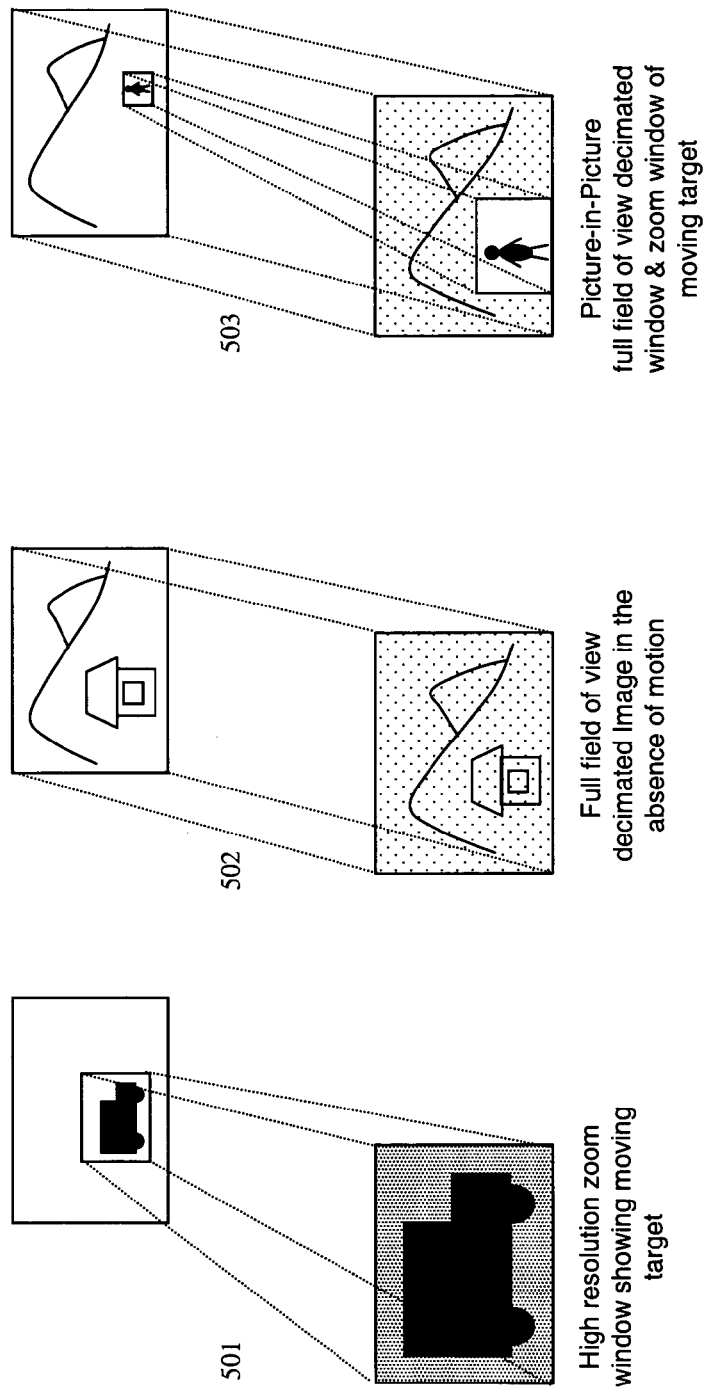
Figure 5. Image transmission and display modes for network camera with automatic bandwidth control

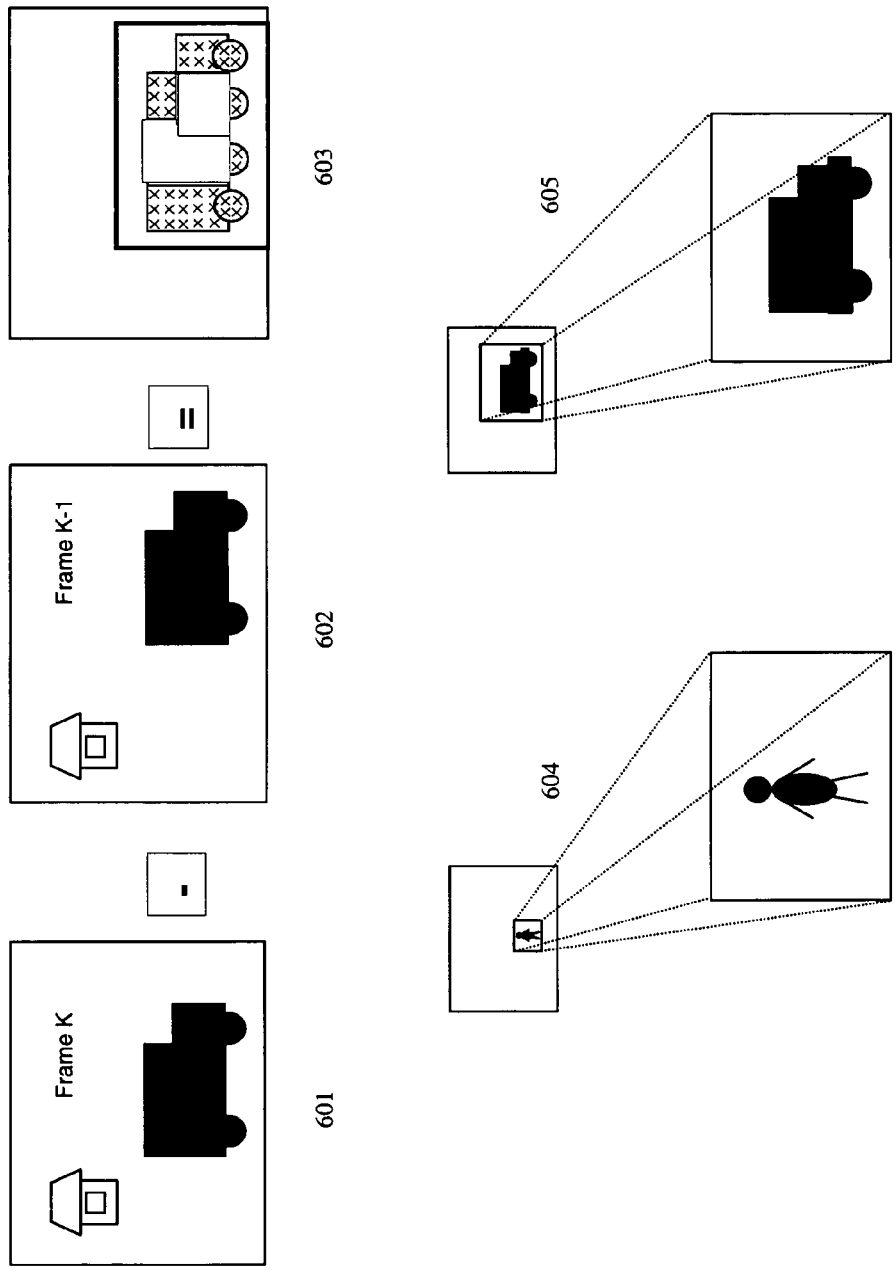
Figure 6. Automatic zoom window selection based on motion detection

HIGH RESOLUTION NETWORK CAMERA WITH AUTOMATIC BANDWIDTH CONTROL

CROSS REFERENCE TO RELATED APPLICATIONS

This application claims the benefit of U.S. Provisional Application No. 60/486,930, filed Jul. 14, 2003, the contents of which are incorporated by reference herein.

Also incorporated by reference herein are the following applications filed on even date herewith:

| Title | Priority Application |
|---|---|
| WIDE DYNAMIC RANGE NETWORK CAMERA | 60/486,929 |
| DUAL SPECTRAL BAND NETWORK CAMERA | 60/486,927 |
| MULTI-SENSOR PANORAMIC NETWORK CAMERA | 60/486,928 |
| DISTRIBUTED VIDEO SURVEILLANCE SYSTEM WITH SECURE REMOTE STORAGE OF ALARMED IMAGES AND REMOTELY ACCESSIBLE IMAGE ARCHIVES | 60/486,926 |
| VIDEO SURVEILLANCE SYSTEM WITH TARGET PATH RECONSTRUCTION | 60/486,931 |

SUMMARY OF THE INVENTION

In contrast to traditional NTSC cameras with resolution dictated by analog television standards, video cameras with on-board network servers (network cameras) are not restricted to any specific resolution, with resolution being only limited by the image sensor, throughput of on-board image processing engine and the bandwidth of the network itself. To make high resolution network video systems practical, multiple cameras have to be present within the same network segment, necessitating bandwidth sharing. Therefore, the use of high-resolution network cameras in multi-camera systems involves the trade-off between the frame rate and size of transmitted over the network images.

In addition to the use of image compression, the efficient use of shared network bandwidth can be further increased by automatic control of image resolution, frame-rate and transmission of automatically identified windows of interest instead of transmission of entire high-resolution images. Present invention discloses the method and apparatus for on-camera automatic selection of image resolution, frame-rate and window of interest based on simple on-board motion detection. It is another aspect of this invention to disclose the multi-camera surveillance system that controls the use of shared network bandwidth by employing cameras with automatic bandwidth control.

BRIEF DESCRIPTION OF FIGURES

FIG. 1 depicts network camera system with automatic bandwidth control;

FIG. 2 depicts steps for automatic resolution and zoom selection;

FIG. 3 depicts multi-camera surveillance system;

FIG. 4 depicts block diagram of network camera with automatic bandwidth control;

FIG. 5 depicts image transmission and display modes of network camera with automatic bandwidth control;

FIG. 6 depicts zoom window selection based on motion detection.

DETAILED DESCRIPTION OF THE INVENTION

The subject of this invention is the network camera comprising an image sensor, image processor, and network interface, where image processor is capable of detecting the motion in the field of view of the camera, extracting/windowing the portion (sub-window) of the image that corresponds to that motion and submitting thus identified sub-window to the network interface hardware for transmission and where said image processor is also capable of submitting to the network interface of the full field of view reduced-resolution (decimated) image either as the only image to be transmitted or as the image to be transmitted in a time-interleaved fashion with the said image window containing the motion.

Another subject of this invention is the video surveillance system comprising multiple network cameras sharing common network bandwidth, where said cameras are equipped with the image processor capable of controlling output bandwidth of the camera based on motion detection. In yet another aspect of this invention the video surveillance system comprises network cameras connected to a common image processing unit where said cameras are capable of windowing and decimating the image based on the external commands and where said common image processor is equipped to determine the motion in the images acquired from the camera and is also equipped to request that the cameras transmit only specified windows containing motion or reduce resolution (decimate) the image in the absence of motion.

In the preferred embodiment of the current invention the network camera consists of high-resolution image sensor (101) with digital output, frame buffer memory (105), network interface hardware (104), and digital image processor (102 and 103) capable of controlling the image sensor, real-time image processing and compression, decimation, windowing and real-time identification of areas of the image corresponding to motion in the field of view of the camera. The preferred embodiment of the present invention also includes computer with monitor (106) receiving camera images by means of network. FIG. 1 illustrates main components of the camera disclosed in the present invention.

FIG. 5 illustrates some of the image transmission modes supported by the disclosed in the present invention camera.

In the preferred embodiment of this invention the network camera is capable of operating in at least three user or automatically selectable modes that include full field of view full resolution image transmission, reduced resolution (decimated) image transmission (502) and window-of-interest image transmission (501), where said image decimation and the size (zoom) and position (pan and tilt) of the window of interest is either selected by the user via said network interface to the image processor or automatically selected by the on-board motion detection module, so that every transmitted window of interest encompasses the area of the image containing most of the moving objects of specified size and/or speed.

In one of the embodiments of the present invention, the camera is capable of transmission of window of interest and decimated full field of view images (503) in a time-interleaved fashion where said interleaving may be performed on a packet-by-packet basis, frame-by-frame basis or any other division of the total transmission time into time slots for both windowed and decimated images.

In yet another embodiment of the present invention network camera automatically adapts the image resolution based on motion detection, where camera transmits full resolution images in the presence of motion and decimated images if there is no detectable motion in the field of view of the camera (502).

There are many motion detection methods known in the art of image processing. Many of known methods can be used for the purpose of the present invention. However, to enable low cost real-time implementation of high resolution video camera disclosed in the present invention, simple and computationally efficient method is essential.

In the preferred embodiment of the present invention the motion detection method is based on subdivision of the entire image into multiple macro-pixels containing one or more pixels of the source image, computing average luminance within each macro-pixel and evaluation of motion in each macro-pixel based on comparison of the average luminance values of that macro-pixel in two distinct image frames. In the preferred embodiment these macro-pixels represent a grid of rectangular sub-windows covering the entire image comprising P pixels (e.g. rectangular macropixels comprising 16×16 pixels), where one or more macro-pixel can be specifically excluded from motion detection analysis. In another embodiment the particular shape, number and size of macro-pixels is specified based on the desired sensitivity to motion in various parts of the image.

In the preferred embodiment of this invention the macro-pixel is determined to potentially contain motion if the absolute difference between values of the average luminance of this macro-pixel in two consecutive image frames, normalized to the average luminance of said macropixel, $\Delta_i$, exceeds a pre-defined macro-pixel motion detection threshold, $TH_i$:

$$\Delta_i = \frac{2 \cdot |\overline{Y}_i^k - \overline{Y}_i^{k-1}|}{(\overline{Y}_i^k + \overline{Y}_1^{k-1})} > TH_i \qquad \text{Eq. (1)}$$

wherein k is the number of the current image in the sequential order, i is the number of the macropixel, $\overline{Y}_i^k$ is the average luminance of the i-th macropixel in the k-th image, and wherein said threshold, TH, may be a constant or vary in proportion to the average macro-pixel luminance or to the average standard deviation of the signal in pixels comprising given macro-pixel (i.e. noise) in order to avoid false detection due to temporal noise in the image:

$$TH_i = \sigma_i \cdot TH_{motion} \qquad \text{Eq. (2)}$$

wherein $TH_{motion}$ is a constant threshold and $$\sigma_i = \frac{1}{P} \sum_{m=1}^{P} |Y_{i,m}^{k-1} - \overline{Y}_i^{k-1}| \qquad \text{Eq. (3)}$$

In another embodiment of the present invention the pixel temporal noise, $\sigma_i$, is taken to be directly proportional to the square root of the pixel luminance.

In the preferred embodiment of the present invention the motion of the object in the image is detected if there exists a cluster of at least N macro-pixels potentially containing motion, wherein a cluster is defined as two or more macropixels located so that their centers can be joined by a continuous curve completely encompassed within the macropixels of the said cluster and wherein the value of N is between one and the total number of macro-pixels in the image frame. Said value N determines the sensitivity of motion detection apparatus to the size of the moving object.

In one of the embodiments of the present invention the sensitivity of the motion detection apparatus to the motion of large objects in low-light imaging conditions is improved by making macro-pixel motion detection threshold inversely proportional to the value N required for motion object to be detected.

FIG. 6 illustrates the automatic zoom sub-window selection based on motion detection. In the preferred embodiment of this invention the motion detection apparatus embedded in the image processor subtracts each frame K−1 (602) from frame K (601) and selects for transmission over the network the sub-window of the image that encompasses macro-pixel where the motion has been detected (603), thus providing motion tracking capability of the network camera. In the preferred embodiment the system automatically zooms on the motion object by selecting the size of sub-window in proportion to the image area containing all or most of the micro-pixels where the motion has been detected (604 and 605). In another embodiment the system selects for transmission the image sub-window of fixed size, centering it in the area of the image with highest density of macro-pixels where motion has been detected. In yet another embodiment of the system, the motion detection apparatus selects as many distinct image sub-windows as the number of disjoint areas of the image where the motion has been detected and submits them to the network interface hardware individually, optionally embedding in the transmission the identifier of the window location with respect to the entire source image.

In the preferred embodiment of the present invention the automatic selection of image resolution and window of interest comprise the following steps, illustrated in FIG. 2. In this embodiment, the incoming image is readout (201) and is subdivided into rectangular macropixels and average luminance of said macropixels is calculated and stored in buffer memory (202). The previously processed image is retrieved from the buffer memory along with stored average luminance values and temporal noise in each macropixel is estimated using Eq. (3) (203). For all macropixels not excluded from motion detection analysis the absolute differences of average luminance values in the current and previous frames, normalized to the average luminance of the macropixel, are then computed using Eq. (1) (204). These said differences are compared against motion threshold given by Eq. (2) (205), and all macropixels with the said difference exceeding said threshold are marked as potentially containing motion in the image. All macropixel potentially containing motion are group into motion clusters (206). The total count of motion clusters containing more than N macropixels is determined (207). If no macropixels of size exceeding N are found then the image is decimated by a factor of D (e.g. D=2) in both directions and submitted to compression engine and network interface for the transmission off camera (208, 216, 217). If one or more motion clusters containing more than N macropixels are found and if the camera is configured to switch to full resolution in the presence of motion, then complete full resolution image is submitted to the compression engine and network interface for the transmission off camera (209 and 213). If one or more motion clusters containing more than N macropixels are found and the camera is not configured to switch to full resolution in the presence of motion, then largest motion cluster is identified (210) and a minimum size window encompassing said largest cluster, W, is determined (211). This said window W is than gradually enlarged until it contains over Z percent of all identified motion clusters (212). If thus expanded window W is larger than F percent of the entire image frame then full resolution image is submitted to the compression engine and network interface for the transmission off camera (214 and 213). If said enlarged window W is smaller than F percent of the entire image than window W is separately submitted to the compression engine and network interface for the transmission off camera (215), with output of window W followed by the output of the full field of view decimated image.

While there are many decimation methods known in the art of the image processing and suitable for the present invention, in the preferred embodiment of the present invention the decimation by a factor of D is achieved by substituting rectangular area containing D×D pixels with one decimated pixel having color and luminance components equal to the average of color and luminance components of all D×D original pixels.

In another embodiment of the present invention automatic bandwidth control also includes the automatic reduction of the camera output frame rate for frames wherein motion has not been detected.

The block diagram of the preferred embodiment of disclosed in the present invention network camera with automatic bandwidth control is illustrated in FIG. 4. In the preferred embodiment of the present invention, the network camera with automatic bandwidth control comprises high resolution image sensor (403), image buffer memory (412, 421 and 429), network interface (422 and 407) and ASIC or Field Programmable Gate Arrays (FPGAs) operating under control of low cost microprocessor (406), where said ASIC or FPGAs implement image pre (401) and post (402) processors in the form of massively parallel image processing pipeline executing time-critical operations on image pixels, where the flow of image pixels is operated on by the sequential stages of the pipeline with each pipeline stage operating in parallel with all or most of the other pipeline stages, while said microprocessor controls the operation of the image processing pipeline, performs image pipeline and network initialization operations, relatively slow operations (performed on a once-per-frame basis) associated with auto exposure, white balance, motion detection and protocol-level network interface computations as well as maintains the register space constituting the user interface to the camera.

In the preferred embodiment of the present invention, the image pre-processor is implemented as image processing pipeline that comprises multiple line memory buffers for 2-dimensional processing (408), block for image interpolation of one-color-per-pixel Bayer pixel array into 3 color-per-pixel stream (409), block implementing image sharpening and low-light signal-to-noise improvement by applying high-pass and low-pass filters to the image (410), color correction block implementing the multiplication of the RGB pixel components by 3×3 color correction matrix (411), RGB to YUV transformation blocks (413 and 414), gamma correction (415), decimation and windowing block (416), motion detection and zoom control block (420), as well as multi-window Auto Exposure (AE) (419) and Auto White Balance (AWB) (418) measurement engines that collect image brightness and color statistics required for motion detection processing disclosed in the present invention and for AE and AWB algorithms, three frame buffers (412, 429 and 421) for storage of previous, current and processed frames and associated memory access controller (417) for ping-pong buffering of stored frames.

In the preferred embodiment of the present invention image post-processor (402) comprises pipelined JPEG image compression and network packet generation modules.

In the preferred embodiment of the invention, pipelined implementation of JPEG compression includes blocks that perform MCU formation and buffering (428), Forward Discrete Cosine Transform (FDCT) (427), zigzag scan, quantization (426) and entropy coding (425). In the preferred embodiment of the present invention 2-dimensional FDCT is implemented as two passes through 1-Dimensional FDCT transform, utilizing the fact that FDCT is a separable transformation.

In yet another embodiment of the present invention, more efficient image compression, such as JPEG2000 or MPEG-2 is substituted for baseline JPEG implementation.

In the preferred embodiment of the present invention a modified version of Trivial File Transfer Protocol (TFTP—as described in RFC783) is implemented as the primary mode of image transmission, where TFTP protocol headers are formed and recorded in the transmit packet buffers (422) by the microprocessor (405), data fields of the TFTP packets, i.e. image data, along with the corresponding checksums (424) are formed by the output stages of the image processing pipeline (423).

In the preferred embodiment of the present invention, following the image compression, the image stream is stored in one of the three network packet buffers, where these buffers are arranged in such a way, that one buffer contains the packet currently being transmitted to the Media Access Control (MAC) Ethernet interface (407), one buffer contains a packet to be transmitted next and one buffer is available for storage of the compressed data coming out of the image compression module. This triple buffered arrangement guarantees that there is always a packet available for transmission, thus maximizing utilization of available network bandwidth and also facilitates re-transmission in the event of network errors.

In the preferred embodiment of the present invention, microprocessor interfaced with image processing pipeline and Ethernet MAC and PHY hardware is also used to support a number of network protocols. In the preferred embodiment, to reduce overall complexity of implementation, a minimal set of protocols consisting of UDP, TFTP, ARP, IP, and ICMP protocols are supported.

In another embodiment of the present invention TCP/IP and DHCP protocols are also supported.

Another subject of the present invention is multi-camera surveillance system that is illustrated in FIG. 3 and comprises local video server (304) connected by means of local area network (LAN) (303) and network switch (302) to one or more network video cameras (301), one or more computer and video monitors (307 and 308) and via network Router Modem (305) to the Internet or other WAN (306), wherein said local server acquires, displays, archives and re-transmits the images from connected to it cameras and wherein said local server is equipped with software program configured to control shared by all connected to it cameras network bandwidth by means of controlling resolution, frame-rate and window of interest of said cameras based on motion detection analysis of acquired images. The WAN (306) transmits the images to a remote user terminal (309) for display or archiving.

In the preferred embodiment of the present invention network cameras connected to the local video server are equipped to decimate and window the image prior to transmission off camera, wherein said decimation and windowing operations occur in response to the commands received from the local video server by means of network interface.

In the preferred embodiment of the present invention the automatic selection of image resolution and window of interest is performed by the software running on the server and comprise the steps, similar to steps illustrated in FIG. 2. In this embodiment, for each camera connected to the local server, said server requests and acquires images that are subdivided into rectangular macropixels and average luminance of said macropixels is calculated and stored in buffer memory. The previously acquired from the same camera and processed image is retrieved from the buffer memory along with stored average luminance values and temporal noise in each macropixel is estimated using Eq. (3). For all macropixels not excluded from motion detection analysis the absolute differences of average luminance values in the current and previous frames, normalized to the average luminance of the macropixel, are then computed using Eq. (1). These said differences are compared against motion threshold given by Eq. (2), and all macropixels with the said difference exceeding said threshold are marked as potentially containing motion in the image. All macropixel potentially containing motion are group into motion clusters (206). The total count of motion clusters containing more than N macropixels is determined. If no macropixels of size exceeding N are found then the server requests an image that is decimated by a factor of D (e.g. D=2) in both. If one or more motion clusters containing more than N macropixels are found and if the server is configured to switch to full resolution in the presence of motion, then complete full resolution image is requested from the camera. If one or more motion clusters containing more than N macropixels are found and the server is not configured to switch to full resolution in the presence of motion, then largest motion cluster is identified and a minimum size window encompassing said largest cluster, W, is determined (211). This said window W is than gradually enlarged until it contains over Z percent of all identified motion clusters (212). If thus expanded window W is larger than F percent of the entire image frame then full resolution image is requested from the camera. If said enlarged window W is smaller than F percent of the entire image than window W is separately requested from the camera, with output of window W requested following the request of the full field of view decimated image.

In the preferred embodiment of the present invention multi-camera surveillance system is equipped with one or more monitors for display of acquired from the cameras images. In the preferred embodiment said image display on said monitors includes a mode wherein window of interest image and full field of view image are displayed simultaneously in a picture-in-picture format. In another embodiment of the present invention said image display on said monitors includes a mode wherein window of interest image is displayed on one of said monitors and full field of view image is displayed on another of said monitors.

What is claimed as new and desired to be protected by Letters of Patent of the United States is:

1. A network video camera supporting multiple output modes including output of full resolution full field of view images, output of reduced resolution full field of view images, and output of window-of-interest partial images, said camera comprising:
    an image sensor for sensing and outputting images;
    an image buffer memory for storing said output images;
    an image processor for decimating said output images to generate images with said reduced resolution and full field of view, and for generating said window-of-interest partial images;
    a network interface for transmission of image data off camera; and
    a motion detection module configured to detect presence of moving objects in the field of view of the camera and to select between said output modes of the camera based on the results of said motion detection, wherein the network interface is capable of transmitting a selected decimated output of said reduced resolution full field of view and a selected output of window-of-interest partial field of view in a time-interleaved fashion, wherein said motion detection module is configured to select said full resolution full field of view images when the presence of moving objects in the field of view of the camera has been detected and to select said reduced resolution full field of view images when the presence of moving objects in the field of view of the camera has not been detected.

2. Network video camera of claim 1, wherein said motion detection module is configured to determine the size of objects moving in the field of view of the camera, and to configure a size of said window-of-interest based on said determined size of said moving objects.

3. Network video camera of claim 1, wherein said motion detection module selects for the output off camera window-of-interest partial images if the presence of moving objects in the field of view of the camera has been detected and wherein said motion detection module configures a size of said window-of-interest to contain all or most of particular moving objects having a specified size, based on a desired sensitivity to motion.

4. Network video camera of claim 1, wherein said motion detection module is configured to reduce camera frame rate when the presence of moving objects in the field of view of the camera has not been detected.

5. Network video camera of claim 1, wherein said motion detection module selects for the output off camera both reduced resolution full field of view images and window-of-interest partial images if the presence of moving objects in the field of view of the camera has been detected and wherein said images are transmitted off camera in a time-interleaved manner wherein transmission of one or more images in one of said output modes is followed by the transmission of one or more images in another of said output modes.

6. Network video camera of claim 1, wherein said camera selects said output modes based on the external input delivered by said network interface.

7. Network video camera of claim 1, wherein said network interface is Ethernet network interface.

8. Network video camera of claim 1, further comprising an image processor equipped to perform image compression.

9. Network video camera of claim 1, wherein said motion detection module is further configured to determine a number of disjoint areas of the image where the motion has been detected, to select as many windows-of-interest as the number of disjoint areas of the image, and to submit said selected number of windows-of-interest to the network interface for transmission off camera.

10. Network video camera of claim 9, wherein an identifier of location of each of said selected number of windows-of-interest with respect to the entire source image is included in each respective window-of-interest before transmission off camera.

11. Network video camera of claim 8, wherein said image processor also comprises image pre-processor equipped to perform image sensor control and color processing.

12. Network video camera of claim 8, wherein said image processor comprises dedicated logic for implementing an image processing pipeline, wherein image pixels are operated on by sequential stages of said image processing pipeline with each pipeline stage operating concurrently with all or most of the other pipeline stages.

13. Method of automatic optimization of network bandwidth for image transmission from a network video camera having a field of view, an output camera mode, and equipped with a motion detection module, the method comprising:

determining presence of moving objects in the field of view of the camera;

selecting the output camera mode to be a reduced resolution full field of view image output if said moving objects are not found in the field of view of the camera, otherwise determining a minimum size rectangular area W of an image that contains more than Z percent of all moving objects, wherein Z is a parameter selectable by a user; and selecting the output camera mode to be a full resolution full field of view image output if said image area W is more than F percent of an entire image area, and selecting the output camera mode to be a window-of-interest output including the image area W, if said image area W is less than or equal to F percent of the entire image area, wherein F is a parameter selectable by the user.

14. The method of claim 13, wherein said determining of the presence of moving objects in the field of view of the camera comprises:

subdividing the entire image area into a grid of macropixels of equal areas, wherein said macropixels are small rectangular image areas comprising one or more pixels;

determining luminance values for all said macropixels by calculating average luminance value of said pixels comprising the macropixel;

storing luminance values of macropixels;

comparing average luminance values of each macropixel in two consecutive frames and determining macropixels potentially containing motion, wherein a macropixel potentially contains motion if its luminance values in two consecutive frames are determined to be substantially different;

grouping said potentially containing motion macropixels into motion clusters, wherein a motion cluster comprises two or more potentially containing motion macropixels, and wherein the centers of said macropixels can be joined by a continuous curve completely encompassed within the macropixels of said motion cluster; and determining the presence of moving objects in the field of view of the camera by determining a presence of said motion clusters containing N or more potentially containing motion macropixels, wherein N is a parameter selectable by the user.

15. The method of claim 14, wherein said comparing of luminance values of each macropixel in two consecutive frames comprises:

determining an absolute value of difference between luminance values of said macropixel in two consecutive frames;

determining normalized luminance difference of said macropixel by dividing said absolute value of difference by the average luminance value of said macropixel in two consecutive frames; and comparing normalized luminance difference with a motion threshold, wherein luminance values of said macropixel in two consecutive frames are determined to be substantially different if said normalized luminance difference exceeds said motion threshold.

16. The method of claim 15, wherein said motion threshold is determined by multiplying $TH_{motion}$ by a measure of root mean square temporal noise reflected in the luminance values of the pixels comprising said macropixels, wherein $TH_{motion}$, is a constant selectable by the user.

17. The method of claim 13, further comprising determining a speed of an object moving in the field of view of the camera, and configuring the size of said window-of-interest based on said determined speed of said moving object.

18. Camera system comprising:

one or more network cameras equipped to support multiple output modes comprising output of full resolution full field of view images, output of reduced resolution full field of view images, and output of window-of-interest partial images;

an image buffer memory;

a network interface for transmission of image data off cameras, wherein said cameras select one of said output modes based on an external command delivered to the cameras by said network interface; and a computer system coupled to said cameras configured to acquire the images from said cameras and including software running on said computer system, wherein said software is configured to detect the presence of moving objects in the fields of view of said cameras and to place said cameras in one of said output modes by communicating a command for selecting an output mode from said multiple output modes, to the camera via said network interface, and to determine a size of said window-of-interest having a size of a minimum rectangular area that contains more than Z percent of all moving objects by gradually enlarging the rectangular area W of the image until it contains over Z percent of all moving objects, where, Z is a parameter selectable by a user.

19. Camera system of claim 18, wherein said software selects as an output mode of camera full resolution full field of view images if the presence of moving objects in the field of view of the camera has been detected and wherein said software selects as an output mode of camera reduced resolution full field of view images if the presence of moving objects in the field of view of the camera has not been detected.

20. Camera system of claim 18, wherein said software is configured to determine the size of objects moving in the field of view of the camera, and to configure a size of said window-of-interest based on said determined size of said moving objects.

21. Camera system of claim 18, wherein said software selects as an output mode of camera window-of-interest partial images followed by the full field of view reduced resolution images if the presence of moving objects in the field of view of the camera has been detected and wherein said software configures a size of said window of interest to contain all or most of particular moving objects having a specified size, based on a desired sensitivity to motion.

22. Camera system of claim 18, wherein said cameras and said software are configured to reduce camera frame rate if the presence of moving objects in the field of view of the camera has not been detected.

23. Camera system of claim 18, further comprising one or more monitors connected to the said computer system, wherein said software displays images acquired from said cameras on said monitors.

24. Camera system of claim 23, wherein said image display on said monitors includes a mode wherein window of interest image and full field of view image are displayed simultaneously in a picture-in-picture format.

25. Camera system of claim 23, wherein said image display on said monitors includes a mode wherein window of interest image is displayed on one of said monitors and full field of view image is displayed on another of said monitors.

26. Camera system of claim 1, in which an output of window of interest partial images is a zoom window.

27. Camera system of claim 1, in which an output of window of interest partial view moves around responsive to the moving objects.

28. Camera system of claim 26, in which said motion detection module is configured to automatically select a zooming of the zoom window responsive to the moving objects.

29. Camera system of claim 26, in which said motion detection module is configured to automatically select a position of the zoom window responsive to the moving objects.

30. Network video camera of claim 1, wherein said motion detection module is configured to determine a speed of an object moving in the field of view of the camera, and to configure a size of said window-of-interest based on said determined speed of said moving object.

* * * * *